United States Patent [19]

Ward

[11] Patent Number: 5,468,700

[45] Date of Patent: * Nov. 21, 1995

[54] HYDROCARBON CONVERSION CATALYST FOR USE IN SELECTIVELY MAKING MIDDLE DISTILLATES

[75] Inventor: John W. Ward, Yorba Linda, Calif.

[73] Assignee: UOP, Des Plaines, Ill.

[*] Notice: The portion of the term of this patent subsequent to Aug. 9, 2005, has been disclaimed.

[21] Appl. No.: 144,419

[22] Filed: Nov. 2, 1993

Related U.S. Application Data

[62] Division of Ser. No. 830,139, Jan. 31, 1992, Pat. No. 5,288,396, which is a division of Ser. No. 573,735, Aug. 28, 1990, Pat. No. 5,116,792, which is a continuation of Ser. No. 332,517, Mar. 3, 1989, Pat. No. 4,990,476, which is a continuation-in-part of Ser. No. 196,942, Apr. 4, 1988, Pat. No. 4,879,019, which is a division of Ser. No. 28,654, Mar. 20, 1987, Pat. No. 4,762,813, which is a continuation of Ser. No. 793,567, Oct. 31, 1985, abandoned, which is a continuation-in-part of Ser. No. 699,919, Feb. 8, 1985, Pat. No. 4,610,973, which is a continuation of Ser. No. 531,924, Sep. 13, 1983, Pat. No. 4,517,074, which is a division of Ser. No. 84,761, Oct. 15, 1979, Pat. No. 4,419,271.

[51] Int. Cl.⁶ ..................................................... B01J 29/06
[52] U.S. Cl. .......................... 502/60; 502/64; 502/65; 502/66; 502/68
[58] Field of Search ............................. 502/60, 64, 65, 502/66, 68

[56] References Cited

U.S. PATENT DOCUMENTS

| | | | |
|---|---|---|---|
| 3,257,310 | 6/1966 | Plank et al. | 502/11 |
| 3,337,474 | 8/1967 | Cornelius et al. | 502/68 |
| 3,391,088 | 7/1968 | Plank et al. | 502/64 |
| 3,407,148 | 10/1968 | Eastwood et al. | 502/55 |
| 3,413,238 | 11/1968 | Gladrow et al. | 502/64 |
| 3,428,550 | 2/1969 | Erickson et al. | 502/64 |
| 3,462,377 | 8/1969 | Plank et al. | 502/64 |
| 3,838,040 | 9/1974 | Ward | 208/111 |
| 3,897,327 | 7/1975 | Ward | 208/111 |
| 3,926,780 | 12/1975 | Ward | 208/111 |
| 3,929,672 | 12/1975 | Ward | 252/455 Z |
| 3,956,104 | 5/1976 | Hilfman et al. | 208/111 |
| 4,036,739 | 7/1977 | Ward | 208/120 |
| 4,094,921 | 6/1978 | Kaeding et al. | 260/671 C |
| 4,176,090 | 11/1979 | Vaughan et al. | 502/63 |
| 4,248,739 | 2/1981 | Vaughan et al. | 502/63 |
| 4,252,688 | 2/1981 | Gallei et al. | 502/66 |
| 4,276,149 | 6/1981 | Chester et al. | 502/55 |
| 4,339,354 | 7/1982 | Gladrow et al. | 502/65 |
| 4,401,556 | 8/1983 | Bezman et al. | 208/111 |
| 4,419,271 | 12/1983 | Ward | 502/65 |
| 4,419,272 | 12/1983 | Ward | 502/65 |
| 4,430,200 | 2/1984 | Shihabi | 502/85 |
| 4,503,023 | 3/1985 | Breck et al. | 423/328 |
| 4,517,073 | 5/1985 | Ward | 208/111 |
| 4,517,074 | 5/1985 | Ward | 208/111 |
| 4,559,314 | 12/1985 | Shihabi | 502/71 |
| 4,559,315 | 12/1985 | Chang et al. | 502/85 |
| 4,565,621 | 1/1986 | Ward | 208/111 |
| 4,594,146 | 6/1986 | Chester et al. | 208/111 |
| 4,608,356 | 8/1986 | Buss et al. | 502/66 |
| 4,610,973 | 9/1986 | Ward | 502/65 |
| 4,615,997 | 10/1986 | Chen et al. | 502/66 |
| 4,629,712 | 12/1986 | Pinnavaia et al. | 502/63 |
| 4,637,991 | 1/1987 | Battiste et al. | 502/68 |
| 4,661,239 | 4/1987 | Steigleder | 208/111 |
| 4,719,004 | 1/1988 | Chu et al. | 208/111 |
| 4,742,033 | 5/1988 | Harris et al. | 502/68 |
| 4,753,909 | 6/1988 | Bousquet et al. | 502/84 |
| 4,761,391 | 8/1988 | Occelli | 502/63 |
| 4,762,813 | 8/1988 | Ward | 502/66 |
| 4,767,734 | 8/1988 | Ward | 502/66 |
| 4,879,019 | 11/1989 | Ward | 208/111 |
| 4,990,476 | 2/1991 | Ward | 502/68 |
| 5,116,792 | 5/1992 | Ward | 502/66 |
| 5,288,396 | 2/1994 | Ward | 208/111 |

FOREIGN PATENT DOCUMENTS

| | | |
|---|---|---|
| 2014970 | 6/1982 | United Kingdom . |
| 2114594 | 8/1983 | United Kingdom . |
| WO8806614 | 8/1988 | WIPO . |
| WO8806488 | 9/1988 | WIPO . |

OTHER PUBLICATIONS

J. W. Ward, "Thermal Decomposition of Ammonia Y Zeolite," *Journal of Catalysis*, vol. 27, 1972, pp. 157–161.

M. L. Occelli, R. J. Rennard, "Hydrocracking with Pillared Clays," American Chemical Society Division of Fuel Chemistry, Preprints of Papers, vol. 29, No. 6, 1984, pp. 30–39.

*Primary Examiner*—Asok Pal
*Attorney, Agent, or Firm*—Thomas K. McBride; Yale S. Finkle; John F. Spears, Jr.

[57] ABSTRACT

A hydrocarbon conversion catalyst useful for converting hydrocarbon feeds to midbarrel products is prepared by extruding a mixture of an inorganic refractory oxide component and a crystalline aluminosilicate zeolite having cracking activity to form extrudates which are broken into particles normally ranging in length between 1/16 and 1/2 inch. The extruded particles are then calcined in the presence of steam at a water vapor partial pressure greater than about 2.0 p.s.i.a., preferably greater than about 5.0 p.s.i.a. The calcination step is carried out in the presence of sufficient steam for a sufficient amount of time at a sufficient temperature to convert the crystalline aluminosilicate zeolite in the extrudates into an ultrahydrophobic zeolite having a unit cell size between about 24.20 and about 24.45 Angstroms and a sorptive capacity for water vapor less than about 5 weight percent of the zeolite at 25° C. and a p/p° value of 0.10.

25 Claims, No Drawings

HYDROCARBON CONVERSION CATALYST FOR USE IN SELECTIVELY MAKING MIDDLE DISTILLATES

CROSS-REFERENCES TO RELATED APPLICATIONS

This application is a division of U.S. Ser. No. 830,139, filed in the United States Patent and Trademark Office on Jan. 31, 1992 and now U.S. Pat. No. 5,288,396, which is a division of U.S. Ser. No. 573,735, filed in the United States Patent and Trademark Office on Aug. 28, 1990 and now U.S. Patent No. 5,116,792, which is a continuation of U.S. Ser. No. 332,517, filed in the United States Patent and Trademark Office on Mar. 31, 1989 and now U.S. Patent No. 4,990,476 which is a continuation-in-part of U.S. Ser. No. 196,942, filed in the United States Patent and Trademark Office on Apr. 4,1988and now U.S. Pat. No. 4,879,019, which is a division of U.S. Ser. No. 28,654, filed in the United States Patent and Trademark Office on Mar. 20, 1987 and now U.S. Pat. No. 4,762,813, which is a continuation of U.S. patent application Ser. No. 793,567, filed in the United States Patent and Trademark Office on Oct. 31, 1985 and now abandoned, which is a continuation-in-part of U.S. patent application Ser. No. 699,919, filed in the United States Patent and Trademark Office on Feb. 8, 1985 and now U.S. Pat. No. 4,610,973, which is a continuation of U.S. patent application Ser. No. 531,924, filed in the United States Patent and Trademark Office on Sep. 13, 1983 and now U.S. Pat. No. 4,517,074, which is a division of U.S. patent application Ser. No. 84,761, filed in the United States Patent and Trademark Office on Oct. 15, 1979 and now U.S. Pat. No. 4,419,271. The disclosure of U.S. Pat. No. 4,762,813 is hereby incorporated by reference in its entirety.

BACKGROUND OF THE INVENTION

This invention relates to a hydrocracking process and a catalyst for use therein. The invention is particularly concerned with a catalyst containing an ultrahydrophobic zeolite which, when used as a hydrocracking catalyst, selectively yields middle distillates.

Petroleum refiners often produce desirable products such as turbine fuel, diesel fuel, and other products known as middle distillates, as well as lower boiling liquids, such as naphtha and gasoline, by hydrocracking a hydrocarbon feedstock derived from crude oil. Feedstocks most often subjected to hydrocracking are gas oils and heavy gas oils recovered from crude oil by distillation. A typical gas oil comprises a substantial proportion of hydrocarbon components boiling above about 700° F., usually at least about 50 percent by weight boiling above about 700° F. A typical heavy gas oil normally has a boiling point range between about 600° F. and 1050° F.

Hydrocracking is generally accomplished by contacting, in an appropriate reaction vessel, the gas oil or other feedstock to be treated with a suitable hydrocracking catalyst under conditions of elevated temperature and pressure in the presence of hydrogen so as to yield a product containing a distribution of hydrocarbon products desired by the refiner. Although the operating conditions within a hydrocracking reactor have some influence on the yield of the products, the hydrocracking catalyst is the prime factor in determining such yields. At the present time middle distillates are not in high demand relative to gasoline in the United States, however, marketing surveys indicate that there will be an increased demand for middle distillates as the year 2000 approaches. For this reason refiners have recently been focusing on midbarrel hydrocracking catalysts which selectively produce middle distillate fractions, such as turbine fuel and diesel fuel, that boil in the 300° F. to 700° F. range.

The three main catalytic properties by which the performance of a midbarrel hydrocracking catalyst is evaluated are activity, selectivity, and stability. Activity may be determined by comparing the temperature at which various catalysts must be utilized under otherwise constant hydrocracking conditions with the same feedstock so as to produce a given percentage, normally about 60 percent, of products boiling below 700° F. The lower the activity temperature for a given catalyst, the more active such a catalyst is in relation to a catalyst of higher activity temperature. Selectivity of hydrocracking catalysts may be determined during the foregoing described activity test and is measured as the percentage fraction of the 700° F.—product boiling in the midbarrel product range of 300° F. to 700° F. Stability is a measure of how well a catalyst maintains its activity over an extended time period when treating a given hydrocarbon feedstock under the conditions of the activity test. Stability is generally measured in terms of the change in temperature required per day to maintain a 60 percent or other given conversion.

As pointed out in U.S. Pat. No. 4,401,556, the disclosure of which is hereby incorporated by reference in its entirety, hydrocracking catalysts containing crystalline aluminosilicate zeolites generally have high activity but relatively poor selectivity for middle distillate products. Because of this, midbarrel hydrocracking catalysts normally employ an amorphous inorganic oxide base containing no zeolitic component. Such catalysts, although selective for middle distillates, are not nearly as active as a catalyst containing a zeolitic component. U.S. Pat. No. 4,401,556 discloses a midbarrel hydrocracking catalyst containing an ultrahydrophobic crystalline aluminosilicate zeolite which catalyst possesses both high activity and high selectivity for producing middle distillates. According to the patent, the selectivity of the ultrahydrophobic zeolite component is abnormally high while the activity and stability of the zeolite are not impaired when compared to other known zeolite supports. The ultrahydrophobic zeolite is prepared from a Y type zeolite starting material having a silica-to-alumina mole ratio of from about 4.5 to about 6.0 and a sorptive capacity for water vapor of at least 6 weight percent at 25° C. and a p/p° value of 0.10 by calcining the zeolite powder in an environment comprising from 0.2 to about 10 atmospheres absolute of steam at a temperature ranging from 725° C. to 870° C. for a period of time sufficient to reduce the zeolite's sorptive capacity for water vapor to less than 5 weight percent at 25° C. and a p/p° value of 0.10.

Midbarrel hydrocracking catalysts have been prepared using one of the ultrahydrophobic zeolites disclosed in U.S. Pat. No. 4,401,556 by subjecting the zeolite to an ammonium exchange and then mixing the ammonium-exchanged ultrahydrophobic zeolite with an inorganic refractory oxide component and an alumina binder material. The resultant mixture is then extruded through a die to form extrudates which are dried at 120° C. and subsequently calcined in air at 900° C. The calcined extrudates are then impregnated with a solution of nickel and tungsten components, dried and again calcined in air. It has now been surprisingly found that different batches of hydrocracking catalysts prepared in accordance with the above-disclosed procedure have varying selectivities for middle distillates, some of which selectivities are relatively low. The commercial use of a midbarrel hydrocracking catalyst with lower than desired selectivity for middle distillates will result in a loss of the desired middle distillate product.

Accordingly, it is one of the objects of the present invention to provide a midbarrel hydrocracking catalyst containing an ultrahydrophobic zeolite, and a method for preparing such a catalyst, which is useful in hydrocracking and has high selectivity for middle distillates, which selectivity does not substantially vary from one batch of catalyst to another. This and other objects of the invention will become more apparent in view of the following description of the invention.

SUMMARY OF THE INVENTION

It has now been found that catalysts containing ultrahydrophobic zeolites prepared by calcining a Y zeolite powder in steam have varying selectivities for middle distillate products. It is believed that this variability in selectivity is caused by the difficulty in commercial operations of uniformly steam calcining the small particles which comprise the zeolite powder. It has been further found that the observed variance in selectivities can be substantially avoided by postponing the steam calcination step until after the Y zeolite powder has been incorporated into the catalyst extrudates. Accordingly, the invention is directed to a catalyst composition prepared by a process in which a mixture of one or more inorganic refractory oxide components and a crystalline aluminosilicate zeolite having cracking activity is extruded to form extrudate particles which are subsequently calcined in the presence of steam at a water vapor partial pressure greater than about 2.0 p.s.i.a., preferably greater than about 5 p.s.i.a. In another embodiment of the invention, a hydrocracking catalyst composition of relatively uniform selectivity for middle distillates is prepared as described above with the additional step of incorporating at least one hydrogenation component, preferably a component containing a metal selected from Group VIA and/or Group VIII of the Periodic Table of Elements, into the steam calcined extrudates. As used herein "Periodic Table of Elements" refers to the version officially approved by the International Union of Pure and Applied Chemistry (IUPAC) in its 1970 rules. An example of such a table may be found in the inside back cover of the book entitled "Advanced Inorganic Chemistry," fourth edition, which is authored by F. A. Cotton and G. Wilkinson and was published in 1980 by Wiley Interscience of New York.

Preferred inorganic refractory oxide components for use in the catalyst of the invention are pillared clays and a dispersion of silica-alumina in an alumina matrix. A preferred crystalline aluminosilicate zeolite for use in the catalyst is a steam stabilized modified Y zeolite prepared by a process comprising the steps of (1) ammonium exchanging a sodium Y zeolite to a sodium content between about 0.6 and 5 weight percent, calculated as $Na_2O$, (2) calcining the ammoni- um-exchanged zeolite at a temperature between about 600° F. and about 1650° F. in the presence of steam at a water vapor partial pressure of at least about 0.2 p.s.i.a. to reduce the unit cell size of said ammonium-exchanged zeolite to a value in the range between about 24.40 and about 24.64 Angstroms, and (3) ammonium exchanging the steam calcined zeolite to reduce the sodium content of the zeolite below about 0.6 weight percent, calculated as $Na_2O$.

The catalyst extrudates are normally calcined in the presence of a sufficient amount of added steam and under conditions such that the unit cell size of the zeolite is reduced at least about 0.10 Angstroms to a value between about 24.20 and about 24.45 Angstroms, preferably between about 24.20 and about 24.39 Angstroms, most preferably between about 24.20 and about 24.35 Angstroms. The residence time, temperature, and water vapor partial pressure utilized during calcination of the extrudates will typically be the same as the residence time, temperature and water vapor partial pressure required to reduce the sorptive capacity of the zeolite for water vapor to less than about 5 weight percent, preferably less than about 4 weight percent, of the zeolite at 25° C. and a p/p° value of 0.10 if the zeolite is calcined in steam alone without first being combined with other components to form extrudates. As used herein "p/p°" represents the water vapor partial pressure to which the zeolite is exposed divided by the water vapor partial pressure at 25° C.

Catalysts of the invention have been found to have consistently high selectivities for producing middle distillates from heavy gas oils. Since variance in catalyst selectivity for middle distillates is avoided by postponing the steaming step until after the zeolite powder has been combined with the refractory oxide component and other constituents of the catalyst in the form of extrudates, the steaming step may be substituted for the air calcination of the extrudates, a step normally employed in preparing hydrocracking catalysts, thereby reducing the number of steps necessary to manufacture the catalyst of the invention and also decreasing the cost of manufacturing.

DETAILED DESCRIPTION OF THE INVENTION

In accordance with the invention, a hydrocarbon conversion catalyst is prepared by extruding a mixture of at least one amorphous or crystalline inorganic refractory oxide component and at least one crystalline aluminosilicate zeolite having cracking activity into extrudates which are then broken into desired lengths and calcined in the presence of steam at a water vapor partial pressure greater than about 2.0 p.s.i.a. As used herein "extruding" includes all forms of pelleting including tableting, extruding, prilling and the like. A midbarrel hydrocracking catalyst may be prepared by adding one or more hydrogenation components to the mixture of inorganic refractory oxide and zeolite that is extruded or by impregnating the steam calcined extrudates with a solution containing one or more hydrogenation components. The steam calcination step is carried out in the presence of sufficient steam, which may be added or generated in-situ, under conditions such that the unit cell size of the zeolite is normally reduced at least about 0.10 Angstroms to a value between about 24.20 and about 24.45 Angstroms. The water vapor partial pressure, residence time and temperature utilized during the steam calcination will be such that, if the zeolite particles are calcined alone in steam under these same conditions prior to being composited with the inorganic refractory oxide and formed into extrudates, the sorptive capacity of the zeolite for water vapor will be less than 5 weight percent of said zeolite at 25° C. and a p/p° value of 0.10. Thus, the zeolite in the steamed catalyst extrudates will be ultrahydrophobic. Catalysts containing zeolites that are converted to ultrahydrophobic zeolites by steaming after the zeolite has been composited with other components and formed into extrudates have been found to have selectivities for producing middle distillates which do not substantially vary from one catalyst batch to another.

The invention is based, at least in part, upon the discovery that, if the zeolite component of a catalyst is steamed prior to compositing the zeolite powder with the refractory oxide component and forming the extrudates, the selectivity of the resultant catalyst for middle distillate products is quite variable, with some batches having high selectivities and other batches having low selectivities. It is believed that this variance in selectivity is the direct result of the small particles that comprise the zeolite powder. Such particles typically range in size between about 0.10 and about 10 microns in diameter. During commercial production it is normal practice to calcine these small zeolite particles in the presence of added steam in an inclined rotary kiln furnace. The small particles of zeolite are introduced at the entrance of the furnace from where they pass at an incline downwardly usually in countercurrent or cocurrent contact with steam which is typically introduced into the exit or entrance of the furnace. Alternatively, the steam may be introduced axially into the furnace through a perforated pipe located in the center of the furnace and running the length of the furnace. Because of the small size of the zeolite particles, it is very difficult to obtain an even distribution of the particles as they flow through the furnace in contact with the steam. Some of the particles may travel faster through the furnace than others, while a large number of particles may travel preferentially down the walls of the furnace or through the center of the furnace. As a result only a portion of the zeolite particles are subjected to steam under the proper conditions required to convert the particles to the desired ultrahydrophobic zeolite. In the extreme, some of the particles may contact so much steam that substantially all of the structural aluminum in the particles is removed, thereby converting the zeolite particles into inactive quartz. Other particles may contact too little steam thus resulting in particles containing too much structural aluminum. The particles of zeolite that have been nonuniformly calcined with steam may not have the desired unit cell size, water sorptive capacity or other properties required of the ultrahydrophobic zeolite that, when combined with a refractory oxide component and hydrogenation metal components, results in a hydrocracking catalyst having a high selectivity for middle distillates.

It has been found that the above-discussed problem can be avoided by eliminating the direct steaming of the zeolite powder and instead compositing the zeolite powder with the refractory oxide component or components in the form of extrudates which can then be subjected to steam calcination —instead of air calcination—under conditions, including the proper water vapor partial pressure, residence time, and temperature, to convert the original zeolite in the extrudates into the desired ultrahydrophobic zeolite. The steam calcination step may be carried in an inclined rotary kiln furnace as before but since the catalyst particles are now in the form of extrudates, which will normally have a diameter of at least about 1/32 of an inch and are much larger than the original zeolite particles, they will pass uniformly through the furnace in such a fashion that the individual particles contact approximately the same amount of steam at about the same temperature for approximately the same time. The end result is the production of a catalyst which will not have substantially different selectivities from one batch to another.

Suitable zeolitic starting materials for use in preparing the catalyst of the invention include crystalline aluminosilicate zeolites which have catalytic activity for cracking hydrocarbons, a sorptive capacity for water vapor greater than 6.0 weight percent of the zeolite at 25° C. and a p/p° value of 0.10, and a unit cell size between about 24.40 and about 24.95 Angstroms. Examples of such zeolites include Y zeolites, modified Y zeolites, X zeolites and modified X zeolites. Preferably, the starting zeolite will have a pore size above about 7.0 Angstroms, will be comprised of 12-membered rings of oxygen atoms, and will nonselectively sorb n-hexane, 2,2-dimethylbutane and larger molecules. The most preferred zeolites for use in preparing the catalyst are crystalline aluminosilicate Y zeolites and modified Y zeolites. U.S. Pat. No. 3,130,007, the disclosure of which is hereby incorporated by reference in its entirety, describes Y-type zeolites having an overall silica-to-alumina mole ratio between about 3.0 and about 6.0, with a typical Y zeolite having an overall silica-to-alumina mole ratio of about 5.0.

The modified Y zeolites suitable for use in preparing the catalyst are generally derived from Y zeolites by treatment which results in a significant modification of the Y zeolite framework structure, usually an increase in the framework silica-to-alumina mole ratio to a value typically above 6.0. It will be understood, however, that, in converting a Y zeolite starting material to a modified Y zeolite useful in the present invention, the resulting modified Y zeolite may not have exactly the same X-ray powder diffraction pattern for Y zeolites as is disclosed in U.S. Pat. No. 3,130,007. The d-spacings may be shifted somewhat due to a shrinkage in the unit cell size caused by an increase in the framework silica-to-alumina mole ratio. The essential crystal structure of the Y zeolite will, however, be retained so that the essential X-ray powder diffraction pattern of the modified zeolite used in the cracking catalyst will be consistent with that of either Y zeolite itself or a Y zeolite of reduced unit cell size. Examples of modified Y zeolites that can be used in preparing the catalyst include ultrastable Y zeolites, steam-stabilized Y zeolites and dealuminated Y zeolites.

Steam-stabilized Y zeolites are Y zeolites which have been hydrothermally treated to increase the framework silica-to-alumina mole ratio but not the overall silica-to-alumina mole ratio of the zeolite. Steam stabilization normally involves calcination of the ammonium or hydrogen form of the Y zeolite starting material at relatively high temperatures, typically above about 900° F., in the presence of steam. This treatment results in the expulsion of tetrahedral aluminum from framework into nonframework positions, but normally does not remove the aluminum from the zeolite and therefore does not increase the overall silica-to-alumina mole ratio of the starting Y zeolite.

A preferred steam stabilized Y zeolite for use as the starting zeolite in preparing the catalyst of the invention is one produced by first ammonium exchanging a Y zeolite to a sodium content between about 0.6 and 5 weight percent, calculated as $Na_2O$, calcining the ammonium-exchanged zeolite at a temperature between about 600° F. and 1650° F. in the presence of steam at a water vapor partial pressure of at least 0.2 p.s.i.a. to reduce the unit cell size of the ammonium-exchanged zeolite to a value in the range between about 24.40 and 24.64 Angstroms, and then ammonium exchanging the steam calcined zeolite to replace at least 25 percent of the residual sodium ions and obtain a zeolite product of less than about 1.0 weight percent sodium, preferably less than about 0.6 weight percent sodium, calculated as $Na_2O$. Such a Y zeolite is highly stable and maintains a high activity. The zeolite is described in detail in U.S. Pat. No. 3,929,672, the disclosure of which is hereby incorporated by reference in its entirety. The same or similar zeolites are sold by the Linde Division of Union Carbide Corporation as LZY-82 zeolite, by PQ Corporation as CP300-56 and by Conteka-BV as CBV-530 and CBV-531. The ammonium exchange steps described above may be facilitated by adding an acid to the ammonium solutions utilized in carrying out the exchanges.

Another preferred steam stabilized Y zeolite is prepared in the same manner as described above except that, instead of exchanging the steam calcined zeolite with ammonium ions, the zeolite is leached with a solution of an organic chelating agent, such as EDTA, or an inorganic or organic acid. Preferably, the steam calcined zeolite is leached with a dilute solution of hydrochloric or sulfuric acid ranging in concentration between about 0.01N and about 10N. Zeolites prepared in the above-described manner are disclosed in U.K. patent application 2,114,594 published Aug. 24, 1983, the disclosure of which is hereby incorporated by reference in its entirety.

The dealuminated Y zeolites that can be used as the starting zeolite for preparing the catalyst are Y zeolites which have been chemically treated with acids, salts, or chelating agents to increase the overall silica-to-alumina mole ratio. A preferred group of dealuminated zeolites is prepared by dealuminating a Y zeolite having an overall silica-to-alumina mole ratio below about 6.0 and is described in detail in U.S. Pat. Nos. 4,503,023 and 4,711,720, the disclosures of which patents are hereby incorporated by reference in their entireties. A preferred member of this group is known as LZ-210, a zeolitic aluminosilicate molecular sieve available from the Linde Division of the Union Carbide Corporation. LZ-210 zeolites and other zeolites of this group are conveniently prepared from a Y zeolite starting material in overall silica-to-alumina mole ratios between about 6.0 and about 20, although higher ratios are possible. Preferred LZ-210 zeolites have an overall silica-to-alumina mole ratio of about 6.1 to about 16. Typically, the unit cell size is at or below 24.65 Angstroms and will normally range between about 24.40 and about 24.60 Angstroms. LZ-210 zeolites having an overall silica-to-alumina mole ratio below 20 generally have a sorptive capacity for water vapor of at least 20 weight percent based on the anhydrous weight of the zeolite at 25° C. and 4.6 millimeters mercury water vapor partial pressure. Normally, the oxygen sorptive capacity at 100 millimeters mercury and −183° C. will be at least 25 weight percent. In general, LZ-210 zeolites are prepared by treating Y zeolites with an aqueous solution of a fluorosilicate salt, preferably a solution of ammonium hexafluorosilicate.

The stability and/or acidity of the starting zeolite may be increased by exchanging the zeolite with ammonium ions, polyvalent metal cations, such as rare earth-containing cations, magnesium cations or calcium cations, or a combination of ammonium ions and polyvalent metal cations, thereby lowering the sodium content until it is less than about 0.8 weight percent, preferably less than about 0.5 weight percent and most preferably less than about 0.3 weight percent, calculated as $Na_2O$. Methods of carrying out the ion exchange are well known in the art.

In accordance with the invention, the crystalline aluminosilicate zeolite starting material is combined with one or more inorganic refractory oxide components, or precursors thereof, such as alumina, silica, titania, magnesia, zirconia, beryllia, a pillared or delaminated clay, a naturally occurring clay such as kaolin, hectorite, sepiolite, attapulgite, montmorillonite or beidellite, silica-alumina, silica-magnesia, silica-titania, mixtures thereof, other such combinations and the like. Examples of precursors that may be used include peptized alumina, alumina gel, hydrated alumina, silica-alumina hydrogels, silica sols and the flocculated reaction product between a swelling clay and a pillaring agent such as polyoxymetal cations and colloidal particles of silica, alumina, titania and the like. The inorganic refractory oxide components or precursors thereof, which serve as a matrix for the zeolite, may be amorphous or crystalline and are usually mixed or comulled with the aluminosilicate zeolite in amounts such that the final dry catalyst mixture will comprise (1) between about 2 and about 80 weight percent zeolite, preferably between about 5 and about 50 weight percent, and (2) between about 20 and about 98 weight percent of one or more inorganic refractory oxides, preferably between about 30 and about 80 weight percent. In some cases where the matrix is not capable of sufficiently binding with the zeolite, an inorganic refractory oxide such as peptized alumina may be used as a portion of the matrix where it serves as a binder.

A preferred inorganic refractory oxide component for use in preparing the catalyst is a heterogeneous dispersion of finely divided silica-alumina in an alumina matrix. Such a material is described in detail in U.S. Pat. Nos. 4,097,365 and 4,419,271, the disclosures of which are hereby incorporated by reference in their entireties. One convenient method of preparing the dispersion is to comull an alumina hydrogel with a silica-alumina cogel in hydrous or dry form. Alternately, the alumina hydrogel may be comulled with a "graft copolymer" of silica and alumina that has been prepared, for example, by first impregnating a silica hydrogel with an alumina salt and then precipitating alumina gel in the pores of the silica hydrogel by contact with ammonium hydroxide. In the usual case, the cogel or copolymer is mulled with the alumina hydrogel such that the cogel or copolymer comprises between about 5 and 75 weight percent, preferably 20 to 65 weight percent of the mixture. The overall silica content of the resulting dispersion on a dry basis is normally between about 1 and about 75 weight percent, preferably between about 5 and about 45 weight percent. Typically, the silica-alumina is dispersed in a gamma alumina matrix.

Other preferred inorganic refractory oxide components that can be used in preparing the catalyst include pillared and delaminated clays. Pillared clays are typically formed by intercalating thermally stable, robust, three dimensional cations, colloidal particles and other materials between the silicate layers or platelets of smectite clays. The shape and size of the intercalated materials allows them to serve as molecular pillars to prop apart the layers of the clay and thereby prevent them from collapsing. The fairly homogeneous distribution of pillars in the interlayered spaces of the clay form an array of rectangular openings, typically about 8 by 15 Angstroms in size, which enable the pillared clay to behave like a 2 dimensional sieve. By adjusting the size of the pillars or the spacing between such pillars, or both, the pore size of the pillared clay may be adjusted to suit a particular application. Pillared clays are typically prepared by intercalating montmorillonite, hectorite, and beidellite, the most common of the smectite clays, with polyoxycations, preferably polyoxycations of aluminum, zirconium, and mixtures of aluminum and zirconium. Pillared clays and their preparation are described more fully in the article entitled "Intercalated Clay Catalysts," *Science*, Volume 220, No. 4595, pp. 365–371 (Apr. 22, 1983) and in U.S. Pat. Nos. 4,176,090, 4,248,739 and 4,216,188. The disclosures of the aforementioned article and patents are hereby incorporated by reference in their entireties. Pillared clays may be optionally treated with steam prior to being combined with the zeolite component of the catalyst and formed into the extrudate particles which are subjected to steam calcination.

A suitable pillared smectite clay for use as a component of the catalyst comprises pillars interposed between the platelets of the clay such that the spacing between the platelets ranges from about 6.0 to about 10 Angstroms and is maintained at such values when the clay is heated to high temperatures. Examples of pillared clays possessing such stability at high temperatures are ones in which the pillars contain one or more rare earth elements such as cerium and/or lanthanum. Such clays are disclosed in U.S. Pat. No. 4,753,909 and in PCT Applications WO 88/06614 and WO 88/06488, the disclosures of which are hereby incorporated by reference in their entireties, and are taught in PCT Application WO 88/06614 to possess outstanding catalytic activity and selectivity in hydrocracking to produce middle distillate products.

The polyoxycations and other agents typically used to pillar smectite clays can also be used to delaminate certain types of clays. Unlike pillared clays in which the propped-apart platelets are oriented face to face, the platelets in a delaminated clay, some of which platelets are propped apart by metal pillars, contain edge-to-edge and edge-to-face linkages or connections which form a macrospace of the type found in amorphous aluminosilicate supports. Delaminated clays can be prepared by reacting Laponite, a synthetic hectorite manufactured by Laporte Industries, Ltd. and other trioctahedral smectite clays having a lath-shape morphology with polyoxymetal cations, colloidal metal and metal oxide particles, and cationic metal clusters as described in U.S. Pat. Nos. 4,629,712 and 4,761,391, the disclosures of which are hereby incorporated by reference in their entireties.

The desired inorganic refractory oxide component(s) or precursor(s) thereof is typically mulled, normally in the form of a powder, with the starting zeolite particles, which particles are preferably not subjected to a steam treatment just prior to being combined with the refractory oxide component. If desired, a binder such as peptized alumina may also be incorporated into the mulling mixture, as also may one or more active metal hydrogenation components such as ammonium heptamolybdate, nickel nitrate, ammonium metatungstate, cobalt nitrate, molybdenum oxide, cobalt oxide, nickel oxide, tungsten oxide and the like. After mulling, the mixture is extruded through a die having openings of a cross sectional size and shape desired in the final catalyst particles. For example, the die may have circular openings to produce cylindrical extrudates or openings in the shape of 3-leaf clovers so as to produce an extrudate material similar to that shown in FIGS. 8 and 8A of U.S. Pat. No. 4,028,227, the disclosure of which is hereby incorporated by reference in its entirety. Among preferred shapes for the die openings are those that result in particles having surface-to-volume ratios greater than about 100 reciprocal inches. If the die opening is not circular in shape, it is normally desirable that the opening be in a shape such that the surface-to-volume ratio of the extruded particles is greater than that of a cylinder. After extrusion, the extruded catalyst particles are broken into lengths of from 1/16 to 1/2 inch. The effective diameter of the extruded particles will normally range between about 1/40 and 1/8 of an inch. The extruded particles will be quite large when compared to the size of the zeolite particles that are mulled to form the material that is extruded. Normally, the effective diameter of the extruded particles will range between about 50 and about 200 times greater than the diameter of the zeolite particles.

After the extruded catalyst particles are broken into the desired lengths and before they are subjected to any potential air calcination, they are subjected to steam calcination by heating the extrudate particles in the presence of water vapor to at least about 500° C., usually between about 600° C. and about 870° C., and preferably in the range between about 700° C. and about 850° C. The steam calcination is normally carried out at a total pressure ranging between about 7.5 p.s.i.a. and about 3000 p.s.i.a., preferably between about 15 p.s.i.a. and above 1500 p.s.i.a. The water vapor partial pressure during the steam calcination will usually range from above about 2.0 p.s.i.a. to about 150 p.s.i.a., preferably from about 5.0 p.s.i.a. to about 35 p.s.i.a. In a preferred embodiment, the steam calcination step is performed in the presence of a gaseous atmosphere consisting essentially of water vapor and most preferably at about atmospheric pressure.

The steam calcination is generally carried out for a period of time correlated with the severity of the calcination conditions, especially the water vapor partial pressure and the calcination temperature, so as to convert the zeolite in the extrudates to an ultrahydrophobic zeolite. The desired ultrahydrophobic zeolites have a unit cell size between about 24.20 and about 24.45 Angstroms, preferably between about 24.20 and 24.39 Angstroms, most preferably between about 24.20 and 24.35 Angstroms, and a sorptive capacity for water vapor less than about 5 weight percent, preferably less than about 4 weight percent, of the zeolite at 25° C. and a p/p° value of 0.10. The zeolites are the same or similar to the UHP-Y zeolites disclosed in U.S. Pat. No. 4,401,556 and U.K. Pat. No. 2,014,970 published on Jun. 29, 1982, the disclosure of the latter patent being hereby incorporated by reference in its entirety. According to these references, a UHP-Y zeolite is defined as a zeolite having a silica-to-alumina mole ratio of from 4.5 to 35, the essential X-ray powder diffraction pattern of zeolite Y, an ion exchange capacity of not greater than 0.070, a unit cell size from 24.20 to 24.45 Angstroms, a surface area of at least 350 meters$^2$/gram (B-E-T), a sorptive capacity for water vapor less than 5 weight percent at 25° C. and a p/p° value of 0.10, and a Residual Butanol Test Value of not more than 0.4 weight percent. The Residual Butanol Test is a measure of the adsorptive selectivity of zeolite adsorbents for relatively nonpolar organic molecules under conditions in which there is active competition between water and less polar molecules for adsorption on the zeolite. The test procedure is described in detail in the above-identified patents.

Preferably, the steam calcination is carried out under conditions such that the ultrahydrophobic zeolite formed during the calcination has a silica-to-alumina mole ratio between about 4.5 and about 9, the essential X-ray powder diffraction pattern of zeolite Y, an ion-exchange capacity of not greater than 0.070, and a Residual Butanol Test Value of not more than 0.4 weight percent. More preferably, the steam calcination is carried out under conditions such that LZ-10 zeolite is formed. LZ-10 zeolite is a modified Y zeolite having a silica-to-alumina mole ratio between about 4.5 and about 6.0, a surface area between about 500 and 700 meters2/gram, a unit cell size between about 24.20 and about 24.35 Angstroms, and a sorptive capacity for water vapor less than about 5 percent by weight of the zeolite at 25° C. and a p/p° value of 0.10.

The steam calcination treatment may be carried out by any number of procedures. In one method, the wet extrudates are merely heated in an enclosed vessel which prevents the escape of water vapor generated in situ. Alternatively, the extrudates may be heated in an autoclave equipped with a pressure relief valve such that superatmospheric pressures of steam may be obtained therein. In yet another procedure, the extrudates may be introduced into a batch or continuous static bed calcination zone into which preheated steam or humidified air is also introduced. Most preferably, however, the extrudates are calcined in an inclined rotary kiln furnace by introducing the extrudates into the kiln at the entrance so that they pass downwardly at an incline in contact with steam that is introduced into the exit of the furnace, into the entrance of the furnace, or through a perforated pipe located in the center of the furnace and running the length of the furnace. Because the relatively small zeolite particles are incorporated into the relatively large extrudate particles, which because of their size are uniformly contacted with steam during the calcination step, the zeolite particles are easily and consistently converted to the desired ultrahydrophobic zeolite.

As mentioned previously, hydrogenation components may be mulled with the zeolite and the inorganic refractory oxide component to form the extrudates which are subsequently subjected to steam calcination. Alternatively, the hydrogenation components may be added by impregnation after the steam calcination step. The hydrogenation component or components may be impregnated into the steam calcined extrudates from a liquid solution containing the desired hydrogenation component or components in dissolved form. In some cases it may be desirable to ion exchange the steam calcined extrudates with ammonium ions prior to adding the hydrogenation metal component or components. This may be done by slurrying the extrudates in a solution of an ammonium salt until the sodium content of the extrudates is decreased below about 0.2 weight percent, calculated as $Na_2O$. Hydrogenation components suitable for incorporation into the catalyst extrudates comprise metals selected from Group VIII or Group VIA of the Periodic Table of Elements. Preferred hydrogenation components comprise metals selected from the group consisting of platinum, palladium, cobalt, nickel, tungsten, chromium and molybdenum. In some cases, it may be desirable that the catalyst contain at least one Group VIII metal component and at least one Group VIA metal component. When this is the case, the preferred combination will normally be a nickel and/or cobalt component with a molybdenum and/or tungsten component.

If the hydrogenation component comprises a noble metal, it is generally desired that the dissolved hydrogenation component be present in the impregnation liquid in a proportion sufficient to ensure that the catalyst contains between about 0.05 and about 10 weight percent of the hydrogenation component, preferably between about 0.10 weight percent and about 3.0 weight percent, calculated as the metal. If the hydrogenation component comprises a non-noble metal, however, it is normally desired that the dissolved hydrogenation component be present in the impregnation liquid in a proportion sufficient to ensure that the catalyst contains between about 1.0 and about 40 weight percent of the hydrogenation component, preferably between about 10 weight percent and about 30 weight percent, calculated as the metal oxide. After the steamed extrudates have been impregnated with the solution containing the hydrogenation component or components, the particles are dried and calcined in air to produce the finished catalyst particles.

Hydrocarbon conversion catalysts prepared as described above are useful in the conversion of a wide variety of hydrocarbon feedstocks to midbarrel products boiling in the range between about 300° F. and about 700° F. If the catalyst does not contain a hydrogenation component, it may be utilized in the absence of added hydrogen as a catalyst for converting hydrocarbons to more valuable products by acid catalyzed reactions, such as catalytic cracking, isomerization of n-paraffins to isoparaffins, isomerization of alkyl aromatics, alkylation, and transalkylation of alkyl aromatics. As used herein "hydrocarbon" refers to any compound which comprises hydrogen and carbon, and "hydrocarbon feedstock" refers to any charge stock which contains greater than about 80 weight percent carbon and hydrogen, calculated as the elements. If the catalyst contains one or more hydrogenation components, it may be used to convert feedstocks in the presence of added hydrogen to a midbarrel hydroconversion product boiling between about 300° F. and about 700° F. The feedstocks that may be subjected to hydrocarbon conversion by the method of the invention include mineral oils, and synthetic oils such as shale oil, oil derived from tar sands, coal liquids and the like. Examples of appropriate feedstocks for hydroconversion include straight run gas oils, vacuum gas oils, and catalytic cracker distillates. Preferred hydroconversion feedstocks include gas oils and other hydrocarbon fractions having at least 50 weight percent of their components boiling above 700° F.

The catalyst of the invention will usually be employed as a fixed bed of catalytic extrudates in a hydroconversion reactor into which hydrogen and the feedstock are introduced and passed in a downwardly direction. The reactor vessel is maintained at conditions so as to convert the feedstock into the desired product, which is normally a hydrocarbon product containing a substantial proportion of turbine fuel and diesel fuel components boiling in the range between 300° F. and 700° F. In general, the temperature of the reaction vessel is maintained between about 450° F. and about 850° F., preferably between about 600° F. and 800° F. The pressure will normally range between about 750 p.s.i.g. and about 3500 p.s.i.g., preferably between about 1000 p.s.i.g. and about 3000 p.s.i.g. The liquid hourly space velocity (LHSV) is typically between about 0.3 and about 5.0, preferably between about 0.5 and 3.0. The ratio of hydrogen gas to feedstock utilized will usually range between about 1000 and about 10,000 standard cubic feet per barrel, preferably between about 2000 and about 8000 standard cubic feet per barrel as measured at 60° F. and one atmosphere.

It will be apparent from the foregoing that the invention is primarily directed to a hydrocracking catalyst prepared in such a fashion that the selectivity of the catalyst for producing midbarrel products boiling between 300° F. and 700° F. from feedstocks containing a substantial proportion of material boiling above 700° F. remains constant from batch to batch. Moreover, the procedure for preparing the catalyst results in a less complicated and cheaper method of catalyst manufacturing.

Although this invention has been primarily described in conjunction with preferred embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. A process for making a hydrocarbon conversion catalyst which comprises:
   (a) extruding a mixture of a first inorganic refractory oxide component, a second inorganic refractory oxide component and a modified Y zeolite, and
   (b) calcining said extrudates in the presence of steam at a water vapor partial pressure greater than about 5.0 p.s.i.a. under conditions such that the unit cell size of said modified Y zeolite is reduced to a value between about 24.20 and about 24.45 angstroms.

2. A process as defined by claim 1 which further comprises impregnating said calcined extrudates with at least one metal hydrogenation component.

3. A process as defined by claim 2 wherein said mixture in step (a) is devoid of a metal hydrogenation component.

4. A process as defined by claim 3 wherein after said calcination said second inorganic refractory oxide serves as a binder for said first inorganic refractory oxide component and said zeolite.

5. A process as defined by claim 4 wherein said second inorganic refractory oxide component comprises peptized alumina.

6. A process as defined by claim 5 wherein said first inorganic refractory oxide component comprises a dispersion of silica-alumina in alumina.

7. A process as defined by claim 5 wherein said first inorganic refractory oxide component comprises silica-alumina.

8. A process as defined by claim 1 wherein said calcination takes place in a gaseous atmosphere consisting essentially of steam.

9. A process as defined by claim 3 wherein said extrudates are calcined under conditions such that the unit cell size of said zeolite is reduced at least about 0.10 angstroms.

10. A process as defined by claim 3 wherein said extrudates are calcined under conditions such that the unit cell size of said zeolite is reduced to a value between 24.20 and 24.39 angstroms.

11. A catalyst composition prepared by the process of claim 1.

12. A catalyst composition as defined by claim 11 devoid of a metal hydrogenation component.

13. A catalyst composition comprising a zeolite, at least one inorganic refractory oxide, and at least one metal hydrogenation component, said catalyst composition prepared by a process comprising:

(a) extruding a mixture of at least one inorganic refractory oxide component and a crystalline aluminosilicate zeolite having cracking activity and an overall silica-to-alumina mole ratio between about 3.0 and about 60 to form extrudates, wherein said mixture is devoid of a metal hydrogenation component;

(b) calcining said extrudates in the presence of steam at a water vapor partial pressure greater than about 5.0 p.s.i.a. under conditions such that the unit cell size of said crystalline aluminosilicate zeolite is reduced to a value between about 24.20 and about 24.45 angstroms; and (c) impregnating said calcined extrudates with at least one metal hydrogenation component.

14. A catalyst composition as defined by claim 13 wherein said crystalline aluminosilicate zeolite used in step (a) is prepared by a process comprising the steps of (1) ammonium exchanging a sodium Y zeolite to a sodium content between about 0.6 and about 5 weight percent, calculated as $Na_2O$, (2) calcining the ammonium-exchanged zeolite at a temperature between about 600° F. and about 1650° F. in the presence of steam at a water vapor partial pressure of at least about 0.2 p.s.i.a. to reduce the unit cell size of said ammonium-exchanged zeolite to a value in the range between about 24.40 and about 24.64 angstroms, and (3) ammonium exchanging the steam calcined zeolite to reduce the sodium content of the zeolite below about 0.6 weight percent, calculated as $Na_2O$.

15. A catalyst composition as defined by claim 13 wherein said crystalline aluminosilicate Y zeolite used in step (a) is prepared by a process comprising (1) ammonium exchanging a sodium Y zeolite to a sodium content between about 0.6 and about 5 weight percent, calculated as $Na_2O$, (2) calcining the ammonium-exchanged zeolite at a temperature between about 600° F. and about 1650° F. in the presence of steam at a water vapor partial pressure of at least about 0.2 p.s.i.a. to reduce the unit cell size of said ammonium-exchanged zeolite to a value in the range between about 24.40 and 24.64 angstroms, and (3) leaching the steam calcined zeolite with a solution comprising an inorganic or organic acid.

16. A catalyst composition as defined by claim 13 wherein said extrudates have a surface-to-volume ratio greater than that of a cylinder.

17. A catalyst composition as defined by claim 13 wherein said extrudates have the cross sectional shape of a three-leaf clover.

18. A catalyst composition as defined by claim 13 wherein said extrudates have the cross sectional shape of a cylinder.

19. A catalyst composition as defined by claim 13 wherein said crystalline aluminosilicate zeolite used in step (a) comprises a modified Y zeolite selected from the group consisting of ultrastable Y zeolites, steam-stabilized Y zeolites, and dealuminated Y zeolites.

20. A catalyst composition as defined by claim 13 which comprises said zeolite, a dispersion of silica-alumina in alumina, and an alumina binder.

21. A catalyst composition as defined by claim 13 which comprises said zeolite, a silica-alumina component, and an alumina binder.

22. A catalyst composition as defined by claim 13 wherein said crystalline aluminosilicate used in step (a) comprises less than about 0.6 weight percent sodium, calculated as $Na_2O$.

23. A catalyst composition as defined by claim 13 wherein the overall silica-to-alumina mole ratio of said crystalline aluminosilicate zeolite is between about 3.0 and about 20.

24. A process for making a hydrocarbon conversion catalyst which consists essentially of:

(a) extruding a mixture of at least one inorganic refractory oxide component and a crystalline aluminosilicate zeolite having cracking activity and an overall silica-to-alumina mole ratio between about 3.0 and about 60 to form extrudates;

(b) calcining said extrudates in the presence of steam at a water vapor partial pressure greater than about 5.0 p.s.i.a. under conditions such that the unit cell size of said crystalline aluminosilicate zeolite is reduced to a value between about 24.20 and about 24.45 angstroms; and (c) impregnating said calcined extrudates with at least one metal hydrogenation component.

25. A catalyst composition prepared by the process of claim 24.

* * * * *